Oct. 16, 1923.

P. H. BUCH ET AL 1,471,098

REFRIGERATING APPARATUS

Filed July 23, 1921  7 Sheets-Sheet 4

Inventors:
Paul H. Buch,
Howard M. Groff,

Oct. 16, 1923.

P. H. BUCH ET AL 1,471,098

REFRIGERATING APPARATUS

Filed July 23, 1921

Inventors:
Paul H. Buch,
Howard M. Groff,
by Spear Middleton Donaldson & Hall
Attys.

Oct. 16, 1923.

P. H. BUCH ET AL 1,471,098

REFRIGERATING APPARATUS

Filed July 23, 1921      7 Sheets-Sheet 7

Inventors:
Paul H. Buch,
Howard M. Groff,
by Spear Middleton Donaldson & Hall
Attys.

Patented Oct. 16, 1923.

1,471,098

UNITED STATES PATENT OFFICE.

PAUL H. BUCH AND HOWARD M. GROFF, OF TRENTON, NEW JERSEY.

REFRIGERATING APPARATUS.

Application filed July 23, 1921. Serial No. 487,020.

*To all whom it may concern:*

Be it known that we, PAUL H. BUCH and HOWARD M. GROFF, citizens of the United States, and residents of Trenton, in the county of Mercer and State of New Jersey, have invented certain new and useful Improvements in Refrigerating Apparatus, of which the following is a specification.

Our present invention relates to ice machines of the automatic type, and aims to provide an exceedingly simple and efficient form of apparatus which may be produced at a low initial cost and which will be capable of being economically operated.

The invention also aims to provide an apparatus in which the refrigerant may be expanded directly into the brine in the expansion chamber instead of being expanded into an expansion coil or the like.

The invention further aims to provide a machine which will not require the use of the customary lubricant in connection with the pump and other parts operating on the refrigerant.

We have also contemplated the provision of various improved features of construction as will hereinafter appear, and our said invention comprises the novel features of construction and arrangement and combination of parts hereinafter described and particularly pointed out by the appended claims.

Our preferred embodiment of the invention is illustrated in the accompanying drawings in which,—

Figure 3 is a side elevation of the same partly broken away.

Figure 3ª is an enlarged sectional detail of the charging member.

Figure 3ᵇ is a sectional detail illustrating a charging container.

Figure 1:
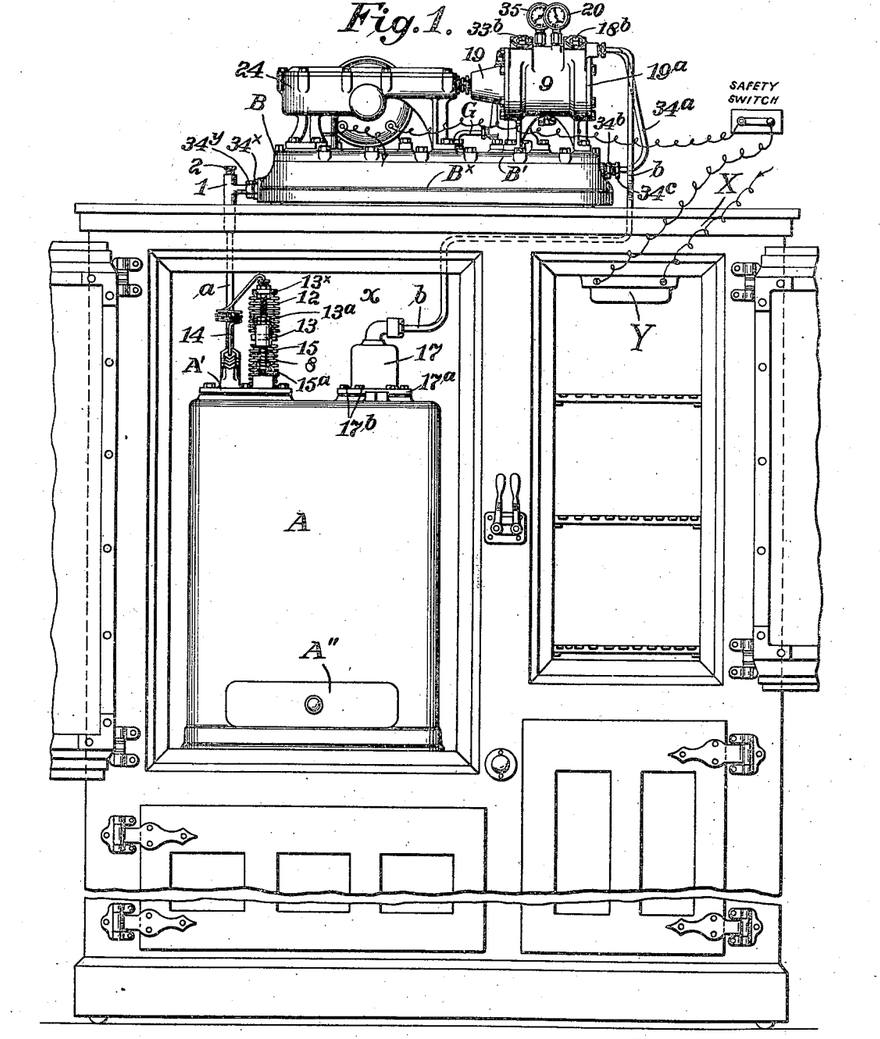
Figure 1 is a front elevation showing a refrigerator with our refrigerating apparatus applied thereto.

Referring more particularly to these drawings, in Fig. 1 we have shown our improved apparatus as installed in connection with a refrigerator of the household type to illustrate how well it is adapted for such use, but such illustration is not to be regarded as in any wise a limitation of the invention.

In this figure the refrigerator is conventionally shown and is indicated by the character X, the space $x$ for the ice being utilized to receive the brine tank or expansion e'ement, designated A as a whole and the condenser being conveniently mounted on the top of the refrigerator and being designated B. The former comprising a brine chamber which is connected with the condenser coils by flow and return pipes, base $B^x$ of the condenser being formed as a water chamber, for the cooling water, in which chamber are located the coils into which the refrigerant is compressed by the pump.

Adjacent to a supporting wall of the condensing chamber (see Fig. 3) is located a coupling member 1 which has one end or branch connected by a suitable coupling with one end of the pipe $a$, and another branch provided with a nipple which is connected with the discharge outlet of condenser coil 34 within the water chamber by connection $34^x$ and sealing nut $34^y$.

Figures 3, 3A, 3B:
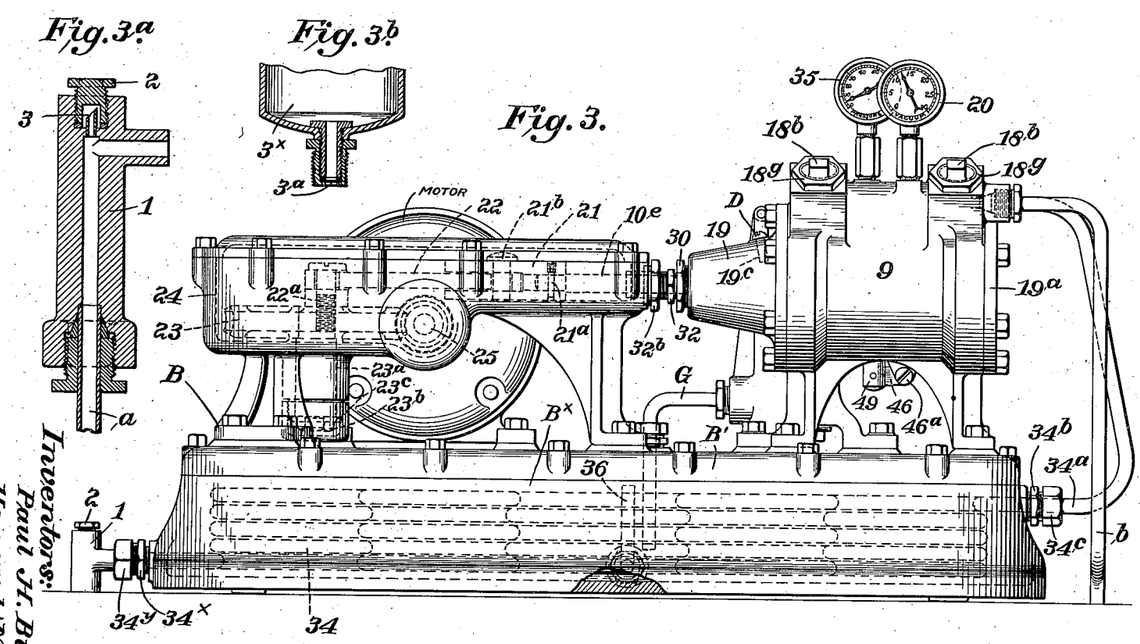
Figure 4:
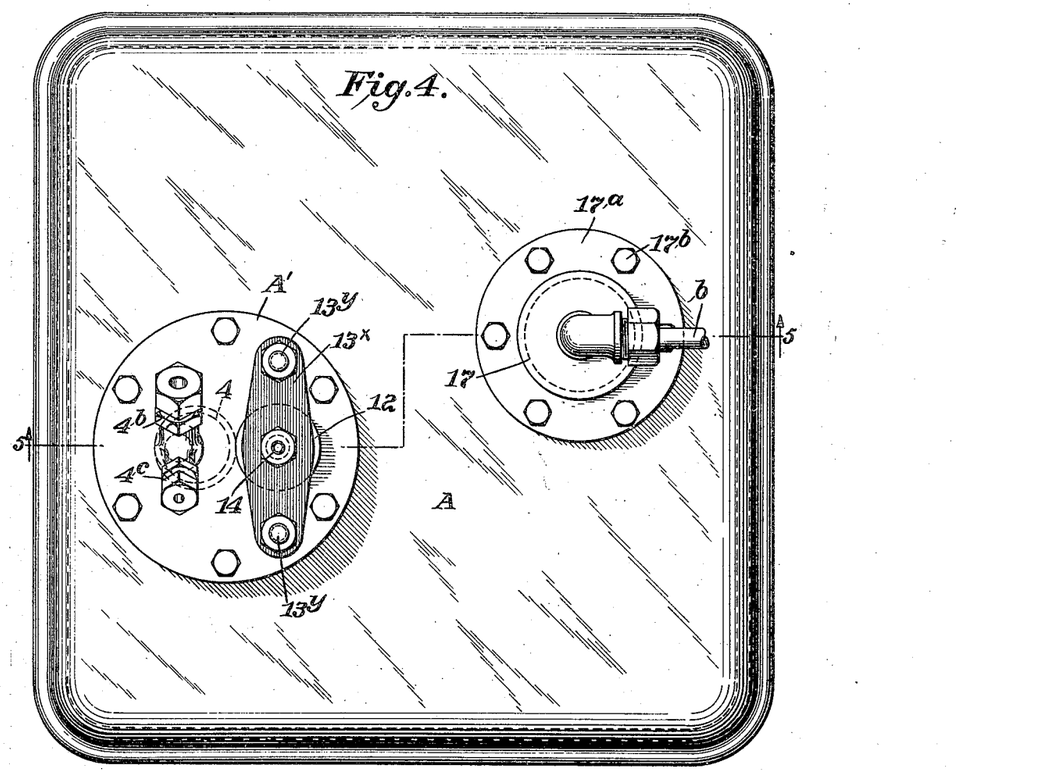
Figure 4 is a plan view of the expansion element.

The member 1 has a threaded opening leading from the exterior to the refrigerant passage through which the refrigerant component (ethyl chloride) may be introduced into the system in any suitable manner, but we prefer to use the construction in which this opening is closed by a screw plug 2 which covers and protects the hollow needle 3 (Fig. 3ª) which serves the dual purpose of piercing the sealing disc 3ª of the refrigerant container $3^x$ when it is screwed into the opening occupied by the screw plug 2 for the purpose of charging the machine without any loss of the refrigerant and also for the purpose of purging air from the system.

Taking the member 1 as a starting point, for example, the liquid refrigerant under pressure, flows through the pipe $a$ to the container 4 located within the expansion vessel. This container 4 may consist, as shown, of a plain tube having its upper end secured to a flange formed on the under side of a closure or carrying member A' removably bolted to the top wall of the chamber A and covering an opening therein, suitable packing being provided to effect a tight joint. The carrying member has a passage $4^a$ communicating with the container 4 and with two hollow nipples, to one of which is connected the discharge end of the pipe $a$ while the other nipple is connected by pipe 14 with the expansible metal bellows or sylphon 12 hereinafter more fully described. At the lower end of the container 4 is a hollow member 7 which receives the refrigerant from the container 4, an interposed strainer being provided as indicated at 5 to remove foreign particles before passing through the expansion valve.

The expansion valve is shown at 6 and it cooperates with a valve seat formed around an upwardly discharging opening in a laterally extended portion of the member 7.

The valve 6 has valve rod $6^a$ which extends up through the carrying member A' and is sylphon operated or controlled in the manner described later on. An opening is provided in the bottom of the member 7 directly below the valve which is closed by a screw plug $6^b$.

Figure 5:
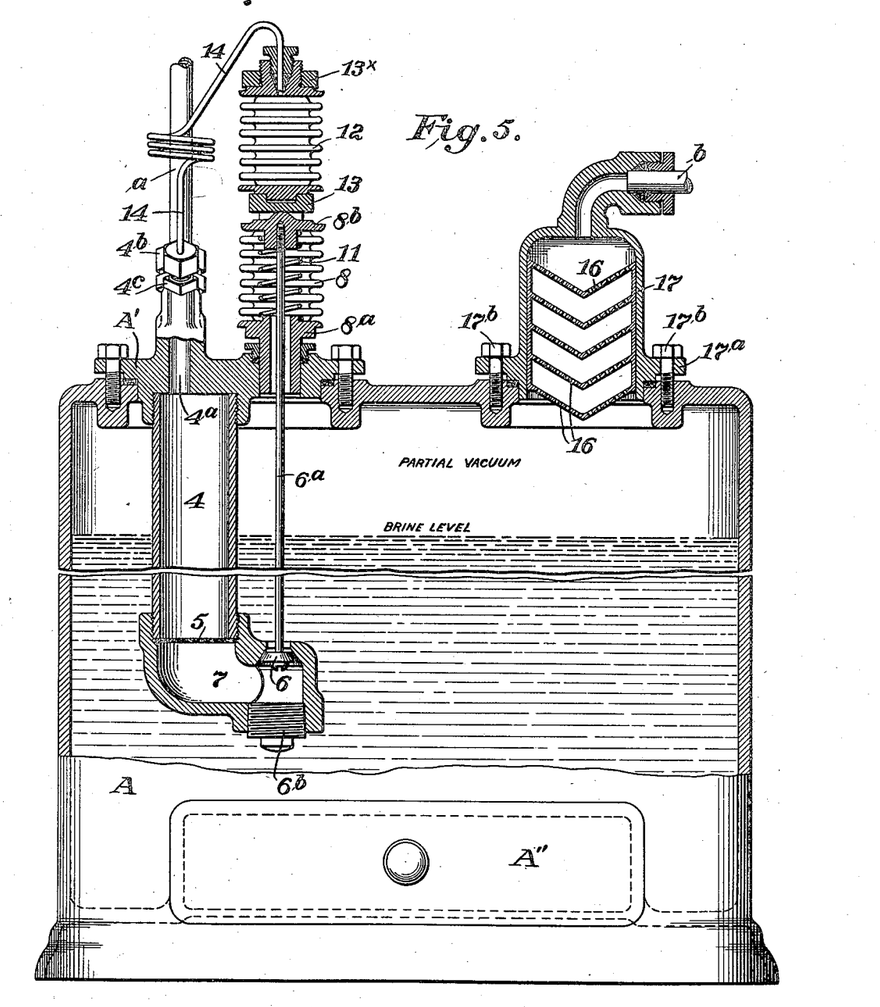
Figure 5 is a section on line 5—5 of Fig. 4, partly broken away and with the lower portion in elevation.

The expansion valve is submerged in the liquid contained in the vessel A, which is brine mixed with alcohol, the approximate liquid level being indicated in Fig. 5. The alcohol referred to forms what we term a secondary refrigerant component, our primary refrigerant component being ethyl chloride which, when commingled with the alcohol by its passage through the mixture of brine and alcohol, forms chloric ether which is our main refrigerant, and which assumes a gaseous state, rising to the portion of the tank above the brine level where exists a partial vacuum. This expansion or conversion from a liquid to a gaseous form during the passage through the brine causes heat to be abstracted from the brine and hence from any chamber in which the brine tank may be placed or which may be constructed around the brine tank. Thereafter the chloric ether is compressed and condensed to liquid form in the manner hereinafter described and again introduced into the brine tank through the expansion valve, the operation being continuous. As hereinbefore stated the tank A is intended to cool by absorption, being placed in the ice chamber of a refrigerator, but in order that a small amount of ice may be manufactured with the apparatus as thus constructed a water containing drawer A" is provided fitting in a recess formed in the lower part of the tank, which may be divided into compartments.

Water placed in these compartments will be frozen into blocks or cubes of ice by the action of the apparatus as above described.

The action of the expansion valve above referred to is controlled by a sylphon 8 which comprises a hollow expansible bellows body having one end secured to the head of a hollow plug $8^a$ screwed into an opening in the carrying member, the hollow portion placing the interior of the expansible body in communication with the interior of the tank above the liquid therein.

The valve rod $6^a$ extends through the hollow plug and is connected at its upper end to a disc or plate $8^b$ which is connected to or closes the upper end of the expansible body or bellows. The partial vacuum maintained in the tank above the brine by the compressor hereinafter described tends to collapse the sylphon in a direction which will open the expansion valve, closing of the valve being assured by the action of spring 11.

In order to insure against failure of the expansion valve to function properly under the action of a partial vacuum another bellows or sylphon 12 (see Fig. 6) is provided above the first named sylphon which comprises an expansible bellows body having its upper end rigidly positioned by a cross bar $13^x$ carried by two posts $13^y$ secured at their lower ends to the carrying member. The cross bar is adjustably fixed by having its ends held between nuts that are threaded on the posts.

Figure 6:
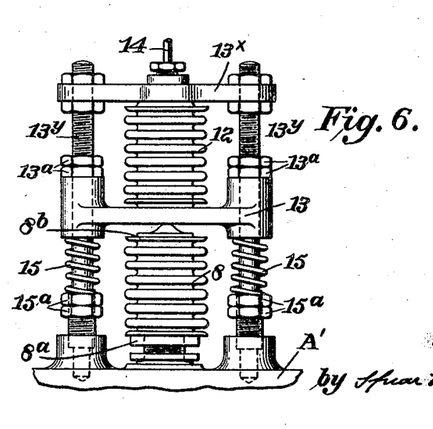
Figure 6 is a detail view of the sylphon means controlling the expansion valve.

The lower end of the bellows or sylphon 12 bears on a sliding yoke 13 interposed between it and the upper end of sylphon 8. Upward movement of the yoke is limited by adjustable stops in the shape of nuts $13^a$ on the posts, and springs 15 encircling the posts, tend to press the yoke upwardly towards the stops, and hence into normal position, the pressure of the springs being capable of being adjusted by the nuts $15^a$.

The sylphon 12 as before stated is connected with the passage $4^a$, and hence with the pressure side of the system, through the tube 14, and if excessive pressure is developed through improper valve action there is a tendency to expand sylphon 12 which will assist sylphon 8 in acting on the expansion valve 6.

By the double sylphon arrangement above described we are able to secure an independent action of either sylphon, or in other words both the pressure and vacuum sides of the system act in controlling the action of the expansion valve.

By having the expansion valve submerged in the liquid and expanding the refrigerant directly into the brine we secure a maximum of efficiency in that the expansion valve is in direct contact with the material (to wit the brine) which it is desired to cool.

The refrigerant in gaseous form bubbles up through the brine, serving in its passage to agitate the brine and keep it in circulation. From the gas space above the brine it passes to the pipe $b$ by which it is conveyed to the compressor 9 of the condensing element B.

The outlet pipe $b$ is preferably connected by a suitably packed coupling to a dome shaped member 17 which has an annular flange $17^a$ secured by screw bolts $17^b$ to the top wall of the casing surrounding an exit opening as shown in Fig. 5, suitable packing being provided as shown.

Suitable baffles are provided in the dome 17, as indicated at 16, to prevent the passage of moisture to the delivery pipe and hence to the compressor, which baffles may conveniently take the shape of reticulated members of inverted dome shape.

Figure 9:
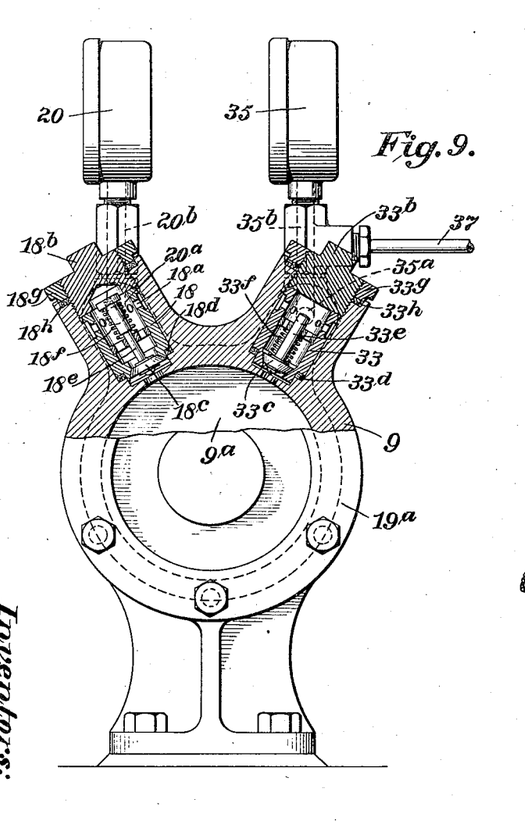
Figure 9 is an end view of the compressor in partial section on line 9—9 of Figure 2.

The condensing element B serves the duel purpose of a container for the cooling or condensing agent and a base or foundation for various members of the compressor unit, and the hollow base $B^x$ is provided with a watertight cover $B'$ securely bolted into place to which in turn is bolted and doweled the compressor casting 9, reduction gear housing 24, and the driving motor which is conventionally shown as an electric motor, and designated "motor". The refrigerant in a gaseous state is drawn off the top of the brine into the compression chamber $9^a$ through inlet ports provided in the compressor casting, and while any suitable compressor may be used we prefer to construct the compressor in the form of a reciprocating compressor having suitable lugs integral with the casting which are bored out to receive valve cages 18 (Fig. 9) held in place by screw plugs $18^b$ and prevented from leakage by packing rings $18^d$ and $18^h$ and packing nuts $18^g$. The valve cages are provided with valve seats at their inner end which cooperate with check valves $18^c$, the stems $18^e$ of which are surrounded by compression springs $18^f$ which tend to hold the valves to their seats. The interior of the passage $20^a$ is in communication with the compression chamber through orifices $18^a$ in the valve cages alternately admitting the gaseous refrigerant to either side of the piston head and is also in communication, through port $20^b$ with a vacuum gauge 20 which records the vacuum maintained by the operation of the compressor.

The gas under pressure of the compressor piston is forced, from either side of the piston head through passage $35^a$ into the condensing coils 34 from which the balance of the heat is absorbed by the surrounding water. The passage $35^a$ connects the interior of two integral lugs on the compressor casting, directly opposed to the intake lugs. These lugs are bored out to receive valve cages 33 held in place by screw plugs $33^b$ and prevented from leakage by packing rings $33^d$, and $33^h$ and packing nuts $33^g$. The valve cages are provided with valve seats at their inner end which cooperate with check valves $33^c$, the stems $33^e$ of which are surrounded by compression springs $33^f$ which tend to hold the valves to their seats. The interior of passage $35^a$ is in communication through port $35^b$ with a pressure gauge 35 which records the pressure maintained by the operation of the compressor. Connection between passage $35^a$ and condensing coils 34 is accomplished through pipe $34^a$ attached by nipple $34^b$ and sealing nut $34^c$ to the inlet end of the coils.

To prevent leakage of the gas past the piston head 10 we employ a novel feature, in that the two split piston rings $10^a$ are located side by side in an annular recess in the piston head which is made in two parts so that in the event of this recess increasing in width by constant pressure of the piston rings first against one side wall of the recess and then against the other side wall as the compressor reciprocates in operation, adjustment can be made in the width of this groove by grinding or otherwise reducing the surfaces of the two parts of the piston head which are in contact with each other until a good fit is obtained for the piston rings. Combined with these piston rings expanding against their inner surface, and holding them in contact with the wall of the compressor 9, is a split bull ring $10^b$ which effectually prevents leakage of gas through the split piston ring down into the annular recess under the ring, thence up through the split in the other piston ring and thus into the portion of the compression chamber on the opposite side of the piston head. We do not depend upon the use of oil as a further seal or lubricant between the piston rings and compressor wall due to the fact that the gas employed hydrolizes and leaves a deposit of hydrocarbon on the surface of metals exposed to the gas that is a sufficient lubricant to retard wear due to friction.

The compressor is sealed at one end by suitably packed head $19^a$ and at the other end through suitably packed closure 19 both head or closures being removably bolted to the end walls of the cylinder casting. The piston rod $10^e$, one end of which is secured to the piston head by nut $10^c$ and locking screw $10^d$, passes through the shaft passage in closure 19 and is securely fastened at the other end to crosshead 21 by taper screw pin 21ª. The reciprocating motion of the piston is obtained by the transference of the rotary motion of the motor through suitable worm reduction gearing and connecting link or pitman 22 secured at one end to the crosshead by crosshead pin 21ᵇ and at the other end to a boss on the worm wheel 23 by shoulder stud 22ª, which is locked securely by set screw 22ᶜ. The bearing surfaces of the connecting link surrounding the crosshead pin and shoulder stud are suitably bushed with bronze sleeves.

Figure 7:
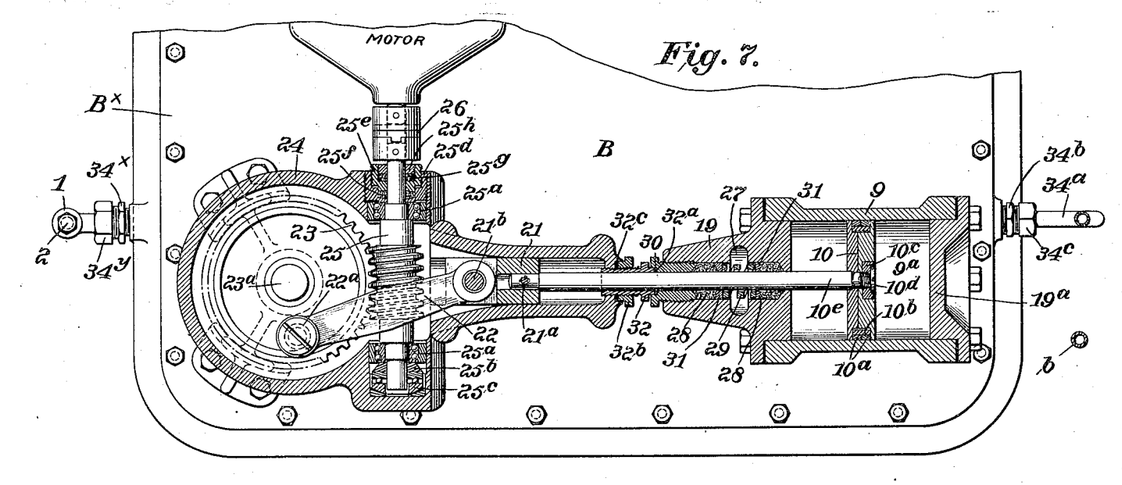
Figure 7 is a sectional plan of the pump or compressor and operating means therefor.
Figure 8:
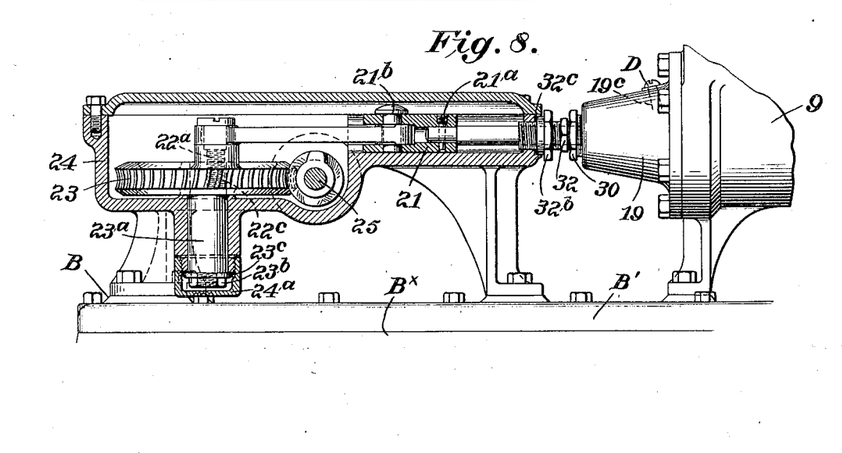
Figure 8 is a longitudinal vertical section of the operating means showing the compressor in elevation and partly broken away.

To prevent any leakage of the gaseous refrigerant from the compressor around the piston rod 10ᵉ, closure 19 has an annular enlarged space or counter bore around the piston rod to provide a space for packing and we prefer to provide two spaced packing rings 28 with an interposed helical compression spring 29 encircling the piston and bearing at its opposite ends against rings or washers 31 which in turn bear against the packing rings. The parts are inserted through the left hand end (Fig. 7) of the shaft passage and held under proper compression by the screw bushing 30.

Preferably the surfaces which bear against the packing are tapered and the end walls of the packing rings are correspondingly tapered as shown.

As a further safeguard against leakage of gas around the piston a port or passage 19ᶜ leads to the spring chamber 27, through which a viscous liquid may be introduced as for example, heavy oil, the opening being closed by a removable screw plug D. This oil will also serve to lubricate the piston rod.

The worm wheel is mounted on a vertical shaft 23ª rotatable in a suitable bearing provided in the gear housing 24 and is secured against vertical displacement by washer 23ᶜ and nut 23ᵇ. The gear housing is also arranged to provide suitable guides in the way of a bottom wall and two vertical walls for the cross head 21 and is also bored out to receive anti-friction radial bearings 25ª and in connection with one of these bearings a spacing washer 25ᵇ and anti-friction self aligning end thrust bearing 25ᶜ, for worm shaft 25, this shaft being reduced at each end to receive said bearings, and having a further reduced extension which is directly connected to the motor shaft by coupling 26. The allowable working displacement of the worm shaft in a longitudinal direction is controlled by nut 25ᵈ which is bored out to receive packing 25ᶠ held in place by packing nut 25ᵉ. This packing and an additional felt washer 25ᵍ secured by nut 25ʰ prevents the leakage of the necessary lubricant with which the interior of gear housing 24 is filled. Further facilities to prevent leakage are provided in the way of cap 24ª covering the end of worm wheel shaft 23ª, and closure 32, packing 32ᶜ and nut 32ᵇ at the extreme end of the crosshead guide. By adjusting closure 32 to compress packing 32ª no leakage will occur at the junction between gear housing 24 and closure 19 of the compressor.

Water is introduced into the condensing chamber from any suitable source such as a city supply main, by way of the safety control and water valve hereinafter more fully described, through the pipe G, and the heated water is conveyed away by the overflow pipe 36.

Figure 2:
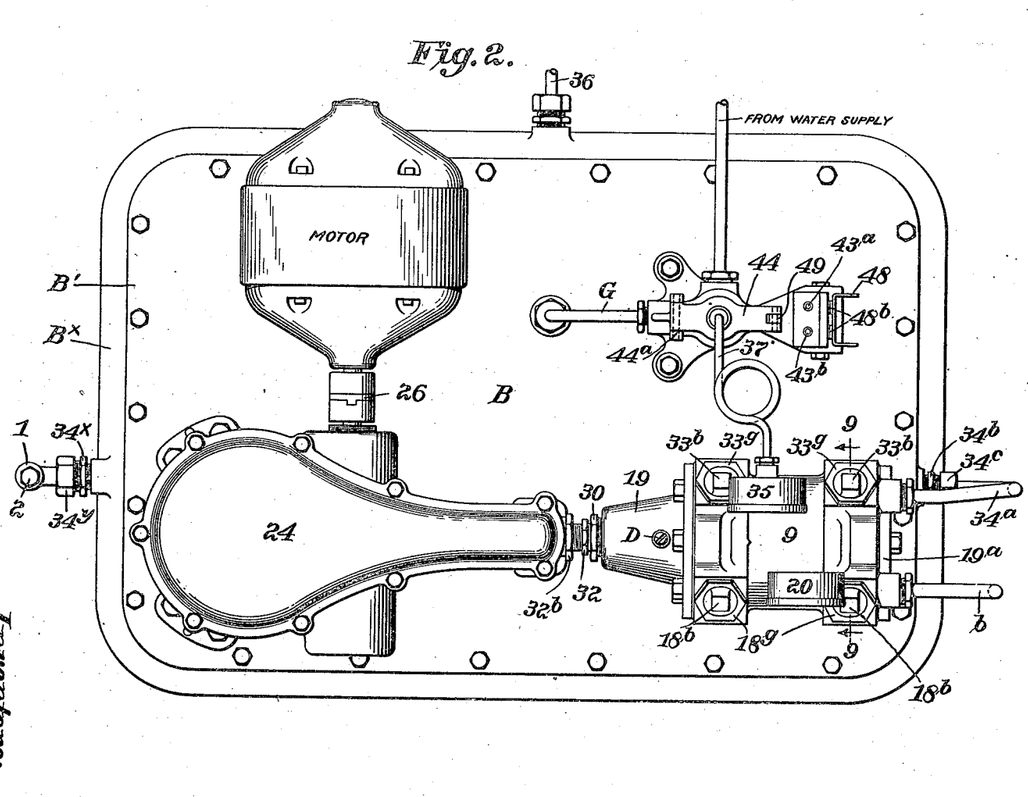
Figure 2 is a plan view of the compressor condenser, or compressing and condensing unit.
Figure 10:
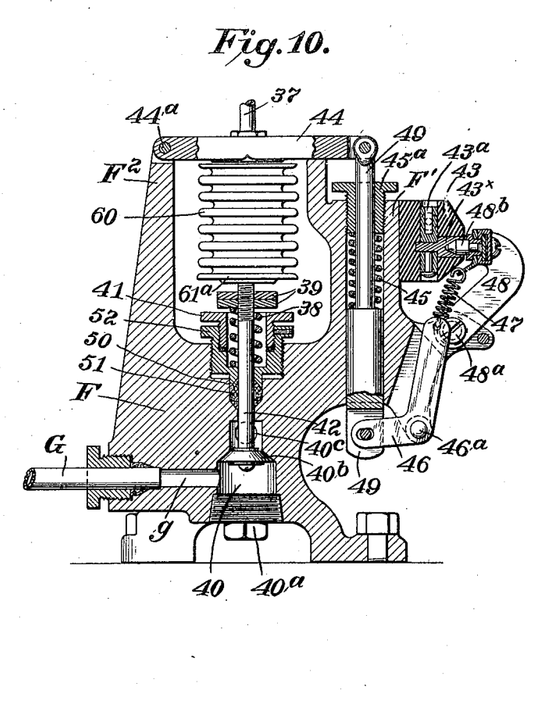
Figure 10 is an en'arged sectional detail of the water valve and safety control means.

This safety control and water valve is shown in plan view in Fig. 2 and in detail on a larger scale in Fig. 10. It comprises a valve body F which has a passage $g$ which communicates with the pipe G, said pipe being secured to a nipple formed on the valve body by a suitably packed joint, said passage communicating at its other end with a valve chamber 40. This valve chamber is preferably formed in the underside of the valve body and closed by a removable screw plug 40ª, it being understood that the valve body is removably bolted to the base of the apparatus.

The valve is shown at 40ᵇ and a water inlet port 40ᶜ communicates with the space above the valve, this inlet port being connected by suitable pipe connections with the water supply line as indicated.

The valve stem 42 extends upwardly through the valve body and is connected at its upper end to a bellows or sylphon 60. The valve stem is provided with suitable packing as indicated at 51 which is under compression of a gland 50 of a screw bushing 52. A spring 38 within the bushing and bearing at its upper end against adjusting nuts 39 tends to seat the valve. The sylphon 60 comprises an expansible bellows body having its lower end plate 61ª connected with the upper end of the valve rod 42 and its upper end plate connected with a lifting arm or lever 44 hereinafter more fully described.

The interior of the sylphon 60 is connected by pipe 37 with the port or passage 35ᵇ so that the pressure caused by the reciprocating compressor or pump expands the sylphon longitudinally, moving the valve rod downwardly to open the valve against the pressure of spring 38. In this action the sylphon expands until the adjusting nuts 39 contact with adjustable contact screw 41 threaded into an internal recess in bushing 52, at which time the valve is fully open and the flow of water permitted. As pressure drops due to stopping of the motor and pump the sylphon contracts and closes the valve thereby preventing waste of water.

To provide for automatically starting or stopping the motor when the pressure is low or too great we provide a switch in the motor circuit which comprises a contact carrying member 43 secured to an upwardly extending arm F' of the valve body F.

Connection is made to the motor by plug 43$^b$ and to the outside line by plug 43$^a$. The upper end plate of the sylphon is connected, as hereinbefore stated with a lever 44 one end of which is pivoted at 44$^a$ with a post or extension F$^2$ of the valve body.

The free end of the lever is connected to a link 49 which passes through a vertical guide passage in the portion or extension F' and has an enlarged portion fitting said passage forming a shoulder against which bears the lower end of a spring 45, the upper end of the spring bearing against an adjustable screw bushing 45$^a$ threaded into a counter bore in part F'. A switch arm 48 pivotally supported upon or from the post F' at 48$^a$ is provided with plugs or members 48$^b$ designed, in the closed position of the switch, to electrically connect the plugs or contacts 43$^a$ and 43$^b$ through terminals 43$^x$ and thus send current through the motor. A bell crank lever 46 is pivotally supported at 46$^a$ from a part of the valve body and has one arm extended horizontally and connected by a pin and elongated slot connection with the lower end of link or member 49 while the other arm is extended upward into proximity to the pivot 48$^a$ of the arm 48 and connected to the free end of said arm by a helical tension spring 47.

The relation of the parts is such that in one position of the bell crank its upper end lies to one side of the pivot 48$^a$ and the tension of the spring holds the switch arm in one position, as for example the closed position shown in Fig. 10, while in the other position said upper arm lies on the opposite side of the pivot and holds the switch arm in open position against a stop pin which limits its movement.

Any pressure generated in the system in excess of what is required for operating the water valve expands the sylphon upwardly or in an opposite direction to that required for opening the water valve, which, through lever 44 pulls up on link or member 49 against the tension of spring 45 and rocks the bell crank lever until the spring carrying end is carried to the right of pivot 48$^a$. During this movement additional power is stored in the spring and as soon as the pivot point or dead center is passed the spring immediately snaps the switch arm to full open position where it is held. Drop in pressure allows spring 45 to move member 49 downwardly in a reverse direction closing the switch in a similar manner.

In an automatic machine of this type it becomes necessary to provide for the operation of the mechanism in such a manner as to maintain as constant and uniform temperature in the cooling chamber as possible and that the constant attendance of an operator is not required thereby tending to reduce the cost of operation and prolong the life of the apparatus. It is realized that in a properly insulated chamber an approximate temperature can be secured and maintained for a considerable length of time before it has dropped below the critical point or high limit in so far as heat is concerned; and that during this period the mechanism can remain at rest. To attain this economical feature a thermostat is placed in the motor circuit which can be regulated to stop the motor when a predetermined temperature is reached and as the chamber gradually heats up to a critical point, often only one or two degrees warmer than the predetermined cold point, this thermostat automatically closes the circuit and starts the motor which runs until the cold point is again reached.

Such a thermostat is indicated at Y and is preferably of the construction disclosed in an application filed by us on the 20th day of April, 1920, Serial Number 375,225.

Having thus described our invention what we claim is:

1. Apparatus of the type described comprising a brine tank, an expansion valve located within said tank near the bottom thereof, a compressor-condenser connected to supply liquid refrigerant under pressure to said expansion valve to be expanded thereby in gaseous form directly into the brine return, pipe connections from the upper portion of said tank to said compressor-condenser, means actuated by variations in the pressure of the refrigerant on the intake side of said valve for controlling the action of the valve and other means controlled by variations in the pressure of the expanded refrigerant in the tank for controlling the action of the valve.

2. In combination a brine tank, an expansion valve within the same below the brine level, a compressor-condenser liquefying refrigerant and having its condensing portion connected with said valve, pipe connections from the upper portion of the tank to the compressor portion, a sylphon having its interior in communication with the upper portion of said tank, and connections from the movable element of said sylphon to said valve.

3. In combination a brine tank, an expansion valve within the same, a compressor-condenser having its condensing portion connected with said valve, pipe connections from the upper portion of the tank to the compressor portion, a sylphon having its interior in communication with the upper portion of said tank, connections from the movable element of said sylphon to said valve, a second sylphon having a movable element cooperating with the movable element of said first named sylphon, and a pipe connection from said second sylphon to the pressure side of the system.

4. In apparatus of the character described, a brine tank, an expansion valve within the same arranged to discharge directly into the brine in the tank, an expansible element carried by the top of the tank and having its interior in communication with the interior of the tank, and having a movable part connected with said valve, pipe connections for supplying refrigerant to said expansion valve, a cross head arranged to bear on the movable part of said expansible element, guides for said cross head, a second expansible element having a movable lower end bearing on said cross head and a relatively fixed upper end, and a pipe connection placing the interior of said second expansible element in communication with the refrigerant supply.

5. In apparatus of the character described, a brine tank, an expansion valve within the same, an expansible element carried by the top of the tank and having its interior in communication with the interior of the tank and having a movable element connected with said valve, pipe connections for supplying refrigerant to said expansion valve, a cross-head arranged to bear on the movable part of said expansible element, guides for said cross-head, springs tending to move said cross-head upwardly, adjustable stops for limiting the upward movement of the cross head, a second expansible element having a fixed upper end and a movable lower end bearing on the cross-head, and means placing the interior of said second expansible element in communication with the refrigerant supply.

6. In combination a brine tank, a tubular container within the same having an offset portion below the normal brine level provided with an upwardly directed discharge opening, an expansion valve controlling said opening, a compressor-condenser connected to deliver refrigerant under pressure to said container, said valve having a stem extending upwardly through the top of the tank, a sylphon carried by the top of the tank and connected to said stem for controlling said valve, and pipe connections from said tank above the brine level to said compressor-condenser.

7. In apparatus of the class described a condenser including condensing coils, a compressor for forcing refrigerant into said coils, a motor for operating said compressor, a water supply for cooling said coils, a hollow expansible element having its interior in communication with the interior of said coils, a valve for controlling said water supply having a connection between said valve and one end of said expansible element, and means connected with the other end of said expansible element for controlling the action of the motor.

8. In apparatus of the class described a condenser including condensing coils, a compressor for forcing refrigerant into said coils, a motor for operating said compressor, a water supply for cooling said coils, a hollow expansible element having its interior connected with the interior of said coils, a valve for controlling said water supply, connections from said valve to one end of said expansible element, a lever pivoted upon a fixed fulcrum and operatively connected with the other end of said expansible element, and means operated by the movement of said lever for controlling the action of the motor.

9. In apparatus of the class described, a condenser including condensing coils, a compressor for forcing refrigerant into said coils, an electric motor for operating said compressor, a water supply for cooling said coils, a valve for controlling said water supply, a hollow expansible element having at one end a movable part connected to said valve, a lever fulcrumed on a fixed pivot and operatively connected with a movable part at the opposite end of said expansible element, a spring exerting tension on said lever, a switch for controlling the flow of current to said motor, and means whereby the operation of said lever operates said switch.

10. In apparatus of the class described, a condenser including condensing coils, a compressor for forcing refrigerant into said coils, an electric motor for operating said compressor, a water supply for cooling said coils, a valve for controlling said water supply, a hollow expansible element having at one end a movable part connected to said valve, a lever fulcrumed on a fixed pivot and operatively connected with a movable part at the opposite end of said expansible element, a pivoted circuit making and breaking switch arm for the motor circuit, a pivoted lever having an arm adapted to lie in its extreme positions on opposite sides of the pivot of said switch arm, a spring connecting said lever arm with the switch arm, and means connecting the first named lever with said last named lever.

In testimony whereof we affix our signatures.

PAUL H. BUCH.
HOWARD M. GROFF.